May 13, 1947. J. R. DUNNIHOO 2,420,589
VALVE
Filed Dec. 13, 1943 2 Sheets-Sheet 2
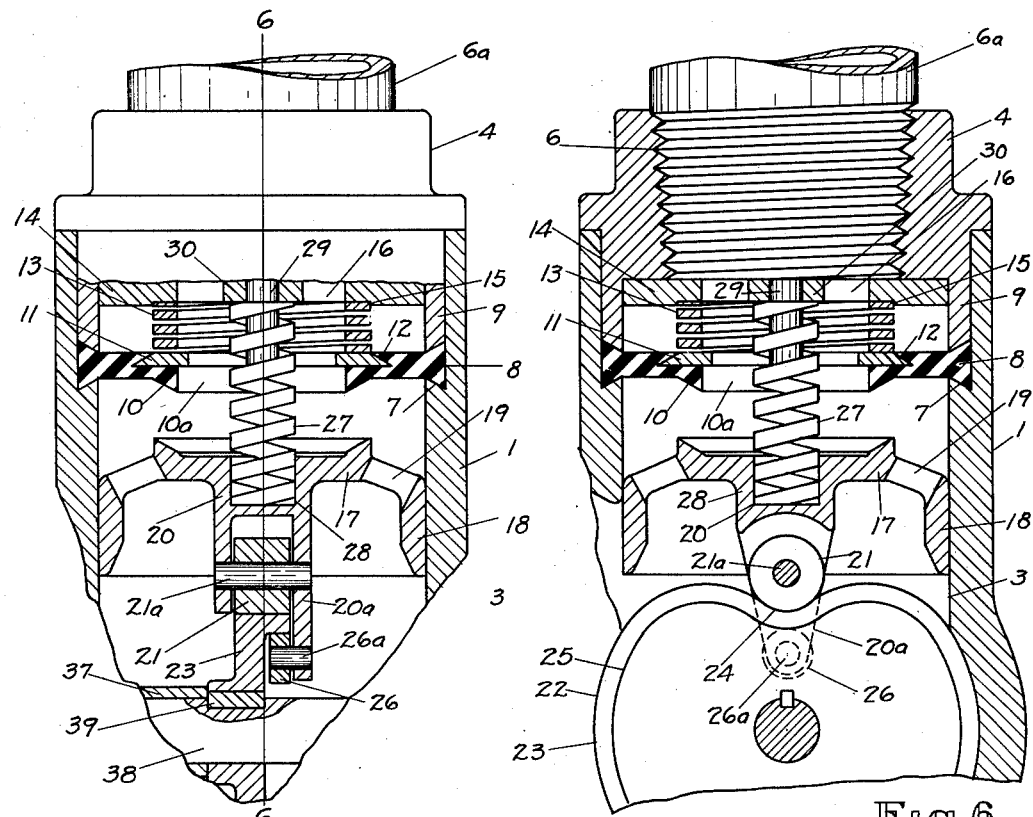
Fig. 5
Fig. 6
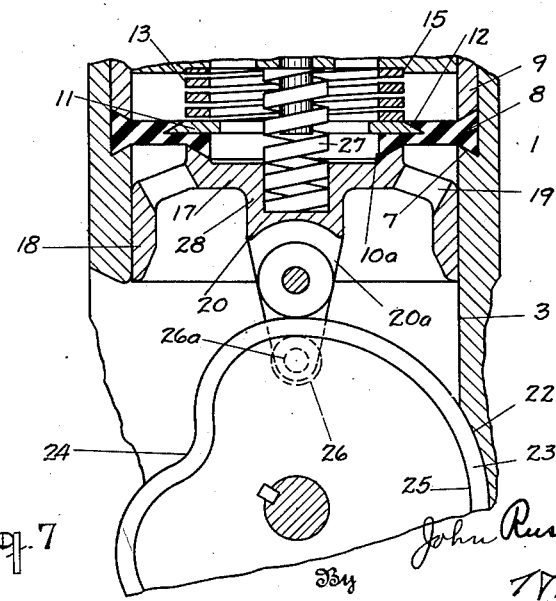
Fig. 7
Inventor
John Russell Dunnihoo
By T. T. Lord
Attorney Patented May 13, 1947

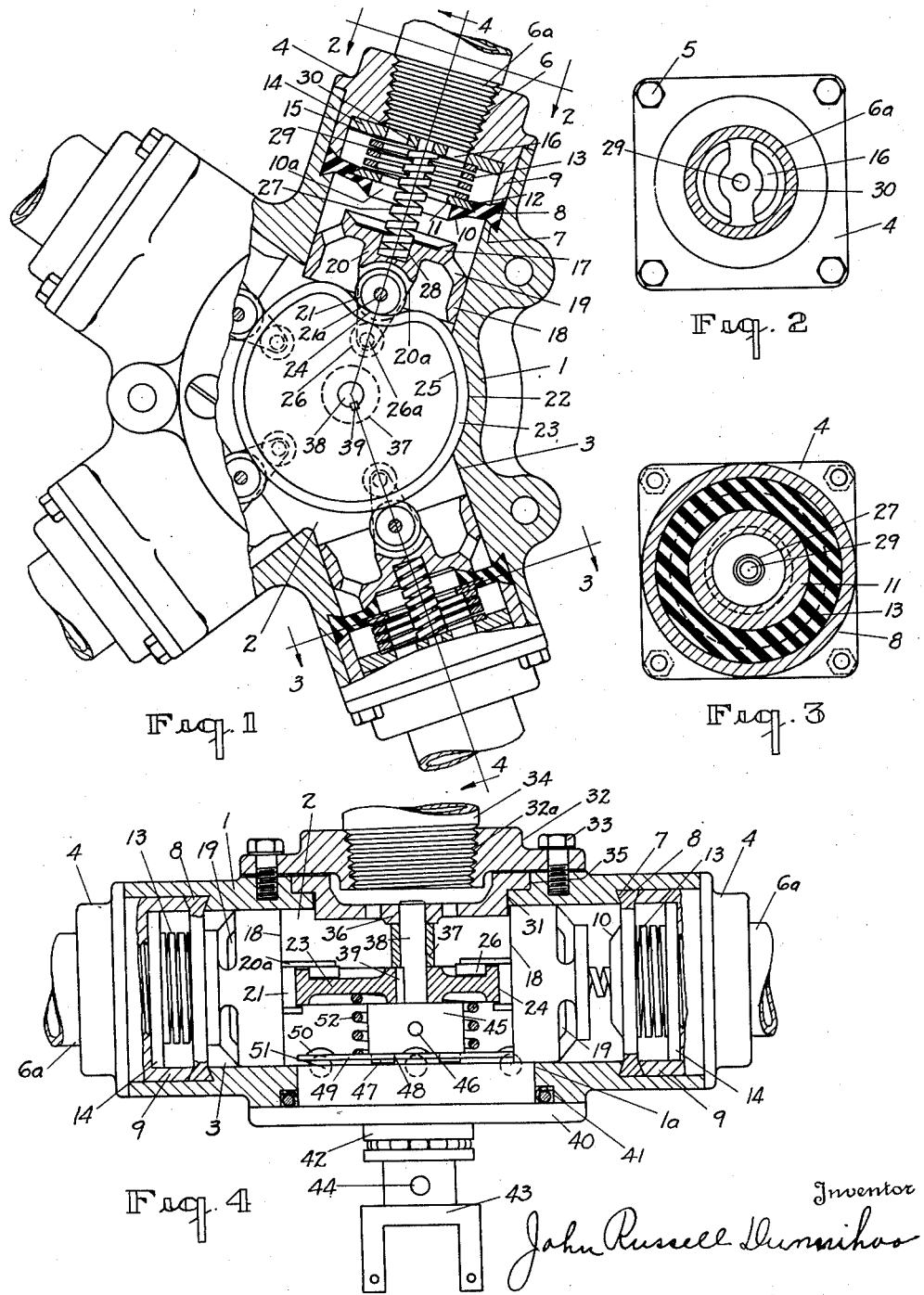

2,420,589

UNITED STATES PATENT OFFICE 2,420,589

VALVE

John Russell Dunnihoo, Erie, Pa., assignor to Rohlm Manufacturing Company, Inc., Erie, Pa., a corporation of Kansas Application December 13, 1943, Serial No. 514,054

12 Claims. (Cl. 251—132)

1

The present invention is directed to an improvement in valves, particularly plural way valves having means for controlling each way. Ordinarily the ways will be arranged extending radially from an intermediate chamber and each way is selectively opened ordinarily one way at a time, the mechanism being so arranged that all the ways may be closed with the operating mechanism at neutral.

The invention is directed particularly to the valve mechanism which is preferably of the poppet-valve type and is of a structure that peculiarly adapts it for this purpose.

Features and details of the invention will appear from the specification and claims.

A preferred embodiment of the invention is illustrated in the accompanying drawings as follows:

Fig. 1 shows a side elevation, partly in section, of the valve assembly.

Fig. 2 is a section on the line 2—2 in Fig. 1.

Fig. 3 is a section on the line 3—3 in Fig. 1.

Fig. 4 a section on the line 4—4 in Fig. 1.

Fig. 5 an enlarged section of one of the valve mechanisms.

Fig. 6 a similarly enlarged view on the line 6—6 in Fig. 5 and showing the valve in open position.

Fig. 7 a view similar to Fig. 6 but with the valve in closed position.

1 marks the body of the valve, 2 an intermediate chamber in the valve body, and 3 ways extending radially from the chamber. The valves and ways are of similar construction, each being as follows:

A cap 4 is secured by screws 5 to the body at the end of the way. This cap has a screw threaded opening 6 in which a nipple 6a is arranged, ordinarily leading from a source of supply.

The wall of the way 3 has a shoulder 7 on which rests an annular flexible seat 8. The cap 4 has an extension 9 which engages the upper surface of the seat and clamps it against the shoulder 7. Preferably the connection between the edge of the seat forms a dovetail connection with the body and extension. The flexible seat has a seating surface 10 on its under side, and this surrounds the opening 10a through the seat. An annular ring 11 is secured on the upper surface of the seat surrounding the opening, preferably being bevelled at its outer edge and extending against a bevelled shoulder 12 on the upper face of the seat. A spring 13 rests against the plate 11 and is seated in an annular pocket 15

2 in a plate 14. The plate 14 is seated on the under side of the cap and is centered by the extension 9. The plate 14 has an opening 16 leading to the opening 6.

A valve head 17 has a valve surface adapted to seat on the seating surface 10. It is carried by a cylindrical guide 18 slidingly mounted in the way 3. It is provided with openings 19 permitting the passage of fluid through the guide. A projection 20 extends from the under side of the head and this has ears 20a between which a roller 21 is placed and rotatively mounted on a pin 21a.

The roller rides a cam surface 22 forming the periphery of a cam wheel 23. The periphery has a cam depression 24 which permits of an inward movement of the roller and with this inward movement of the roller, an inward or opening movement of the valve head 17. As the periphery of the cam is moved, bringing into position the full sides of the cam, the roller is pushed outwardly and with it the valve head is moved into seating position on the surface 10. The closing movement has a slight overrun beyond the actual seating, thus forcing the slight yielding of the flexible seat. This overrun is sufficient so that any wear on the seat will be taken up automatically with the continued use of the valve.

Preferably the cam wheel has an inner cam surface 25 positioned opposite the cam surface 22. One of the ears 20a is extended inwardly and a roller 26 is carried by a pin 26a on the ear. This roller operates on the cam surface 25 and positively withdraws the valve head for the opening position. It not only withdraws the valve head, but locks it in this open position until the cam ring is moved to other locations. Preferably a spring 27 extends into a socket 28 in the valve head and the upper end is held in position by a pin 29, this pin being carried by a spider 30, the arms of which extend through the opening 16 to the outer periphery of the plate. This spring may be made strong enough of itself to open the valve under its conditions of use, in which case the roller 26 may be omitted, or the spring may be of such strength as to merely aid in the opening movement, or, under certain conditions, can be omitted entirely. The closing cam, however, has the advantage of positively locking the valve in its closed position. Under some conditions of use, this is important.

The body has an axially extending opening 31 ordinarily used for the discharge. This is covered by a cap 32. The cap 32 is secured to the body by screws 33. The cap has a screw threaded opening 32a in which is arranged a nipple 34 leading ordinarily to a point of use.

A plate 35 is secured in the opening 31 by the cap 32 and this has a spider 36 forming a support for a journal 37 for a cam operating stem 38. The stem is locked with the cam by a key 39. The body has an axially extending opening 1a which is closed by a cap 40. A gasket 41 is arranged around the opening under the cap. The stem 38 extends outwardly through the cap and through a stuffing box 42 and is secured by a pin 44 with a coupling 43, from which the stem may be operated.

A sleeve 45 is fixed on the stem by a pin 46. The sleeve has outwardly extending ears 47. These ears extend slidingly through slots 48 in a detent plate 49. The plate 49 has a series of detents 50 which engage balls 51 carried in sockets in the inner face of the cap 40. A spring 52 yieldingly presses the plate against the balls. These balls and detents are spaced so that with a movement from one ball to another, the cam is brought from one opening to another or may be brought to the neutral position. The balls lock the cam and consequently the valve structures in an adjusted position either in position to have a selected valve open (if the cam is designed to open only one valve at a time) or to have any or all the valves closed by locking the cam at neutral position.

It will be noted that the valve may operate in the following manner:

First, closed position with pressure applied from the outside toward the interior or cam side: The valve cannot be forced open, as the valve follower is rigidly held against the cam surface.

Second, closed position with pressure applied from the inside toward the exterior or away from the cam: The valve may be forced away from the cam follower, but the seal is increased between the valve and seat. This inherently requires lost motion between the cam and follower and greater resultant force, due to fluid pressure, on the valve than on the seat.

Third, open position with pressure applied from the outside toward the interior or cam side: The valve is opened by turning the cam to the depressed portion, allowing the valve to open with pressure exerted from the outside and aided by the spring or positively forced by the inner cam surface.

Fourth, open position with pressure applied from the inside toward the exterior, or away from the cam: The valve in the open position is kept from closing until the internal pressure overcomes the spring tension if the spring alone is used and is maintained positively open if the inner cam is applied.

What I claim as new is:

1. A valve comprising a body having an intermediate fluid chamber and a way leading therefrom, a valve seat comprising an annular diaphragm of flexible material with a seating surface at its center, the outer edge of the seat secured to the wall of the way and the inner edge of the seat yielding and spaced from the wall of the way, a valve head operating to and from the seat, a spring operating on the inner edge of the seat biasing the seating surface toward the head, and means within the chamber operating the head, said means providing an overrun flexing the seat with each closing.

2. A valve comprising a head having an intermediate fluid chamber and a way leading therefrom, a valve seat comprising an annular diaphragm of flexible material with a seating surface at its center, a cap on the way and securing the outer edge of the seat to the wall of the way, the inner edge of the seat being yielding and spaced from the wall of the way, a valve head operating against the seat, means within the chamber operating the valve head, and a spring seated against the cap opposing the yielding of the inner edge of the seat.

3. A valve comprising a body having an intermediate fluid chamber and a way leading therefrom, a valve seat comprising an annular diaphragm of flexible material, a cap on the way and securing the outer edge of the seat to the wall of the way, the inner edge of the seat being yielding and spaced from the wall of the way, a valve head operating against the inner edge of the seat, means within the chamber operating the valve head, and a spring seated against the cap and operating on the head tending to open the head.

4. A valve comprising a body having an intermediate chamber and a way leading therefrom, an annular flexible valve seat having its outer edge fixed to the way and its inner edge providing a yielding valve seating surface spaced inward from the wall of the way, a valve head opening and closing by movement toward and from the seat, said head and seat being movable by inward and outward fluid pressure, and a spring operating on the seat resisting closing pressure of the valve.

5. In a plural way valve comprising a body having an intermediate chamber and a plurality of ways leading therefrom, an annular flexible valve seat having its outer edge fixed to one of the ways and its inner edge providing a yielding valve seating surface spaced inward from the wall of the way, a valve head opening and closing by movement toward and from the seat, and means controlling said valve head to open and close the valve from outward or inward pressure comprising devices preventing movement of the head from the closed toward the open position, the relative area of the valve head and seat exposed to fluid pressure being such that the valve head and seat are held in engagement by fluid pressure in the direction to close the valve.

6. In a plural way valve comprising a body having an intermediate chamber and a plurality of ways leading therefrom, an annular flexible valve seat having its outer edge fixed to one of the ways and its inner edge providing a yielding valve seating surface spaced inward from the wall of the way, a valve head opening and closing by movement toward and from the seat, a spring operating on the inner edge of the seat resisting closing pressure of the head, and means closing the head against the seat, the relative area of the valve head and seat exposed to fluid pressure being such that the valve head and seat are held in engagement by fluid pressure in the direction to close the valve.

7. A plural way valve comprising a body having an intermediate chamber and a plurality of ways leading therefrom, an annular flexible valve seat having its outer edge fixed to one of the ways and its inner edge providing a yielding valve seating surface spaced inward from the wall of the way, a valve head opening and closing by movement toward and from the seat, said seat being movable by inward and outward fluid pressure, and means operating from the intermediate chamber controlling said valve head, said means comprising a double acting cam having lost motion positively actuating the valve toward or from closing position.

8. A valve comprising a body having an intermediate chamber and a way leading therefrom, a valve seat comprising an annular diaphragm of flexible material with a seating surface at the center, the outer edge of said seat secured to the wall of the way and the inner edge of the seat yielding, a spring resisting yielding of the seat under closing pressure, a valve head operating to and from said seat, the seat being movable by inward and outward pressure, and means operating from the intermediate chamber controlling said head.

9. A valve comprising a body having a chamber from which a way extends, a valve seat formed of flexible material, the outer edge of the seat secured to the wall of the way and the inner edge of the seat yielding and provided with a seating surface spaced from the wall of the way, a valve head operating to and from said seat, a spring resisting yielding of the valve seat, a spring urging the head away from the seat, and a cam and cam follower for moving the head toward the seat.

10. A valve comprising a body having a fluid chamber from which a way extends, a valve seat comprising an annular diaphragm of flexible material with a seating surface at its center, the outer edge of the seat secured to the wall of the way and the inner edge of the seat yielding and spaced from the wall of the way, a valve head operating to and from said seat, a spring operating on the inner edge of the seat biasing the seating surface toward the head, and means in the chamber operating the head.

11. A valve comprising a body having a chamber from which a way extends, a valve seat comprising an annular diaphragm of flexible material with a seating surface at its center, the outer edge of the seat secured to the wall of the way and the inner edge of the seat yielding and spaced from the wall of the way, a valve head operating to and from said seating surface, means operating the head, and a spring operating on the inner edge of the flexible seat and yieldingly resisting the flexing of the seat.

12. A valve comprising a body having a chamber from which a way extends, a valve seat comprising an annular diaphragm of flexible material with a seating surface at its center, the outer edge of the seat secured to the wall of the way and the inner edge of the seat yielding and spaced from the wall of the way, a valve head operating to and from said seating surface, means operating the head, and a spring operating on the inner edge of the flexible seat and yieldingly resisting the flexing of the seat, said means providing an overrun flexing the seat with each closing.

JOHN RUSSELL DUNNIHOO.

REFERENCES CITED

The following references are of record in the file of this patent:

UNITED STATES PATENTS

| Number | Name | Date |
|---|---|---|
| 2,219,982 | Downey | Oct. 29, 1940 |
| 2,055,122 | Farmer | Sept. 22, 1936 |
| 948,404 | Webb | Feb. 8, 1910 |
| 1,270,154 | Heim | June 18, 1918 |
| 544,743 | Nilson | Aug. 20, 1895 |
| 1,737,427 | Meals | Nov. 26, 1929 |
| 2,332,695 | Cantor | Oct. 26, 1943 |

FOREIGN PATENTS

| Number | Country | Date |
|---|---|---|
| 611,167 | France | 1926 |